United States Patent [19]

Noel

[11] Patent Number: 4,736,829

[45] Date of Patent: Apr. 12, 1988

[54] CENTRIFUGAL CLUTCH FOR A LOCKING ACTUATOR OF A MOTOR VEHICLE DOOR LATCH

[75] Inventor: Jean P. Noel, Saint Die, France

[73] Assignee: Rockwell-CIM, France

[21] Appl. No.: 14,755

[22] Filed: Feb. 13, 1987

[30] Foreign Application Priority Data

Feb. 20, 1986 [FR] France ................................. 86 02323

[51] Int. Cl.[4] ...................... F16D 11/00; F16D 43/16; E05B 53/00
[52] U.S. Cl. ......................................... 192/71; 70/237; 70/279; 74/414; 192/105 BB; 292/DIG. 23
[58] Field of Search .................. 192/105 BB, 105 BA, 192/105 A, 71; 70/237, 279, 275; 292/201, DIG. 23; 74/414

[56] References Cited

U.S. PATENT DOCUMENTS

| | | | |
|---|---|---|---|
| 1,969,561 | 8/1934 | Keller | 192/105 BB X |
| 2,386,645 | 10/1945 | Williams | 192/105 BA X |
| 2,651,395 | 9/1953 | Syrovy et al. | 192/105 BB X |
| 2,754,948 | 7/1956 | Pohl | 192/105 BA |
| 4,290,634 | 9/1981 | Gelhard | 292/201 |
| 4,520,914 | 6/1985 | Kagiyama et al. | 192/105 BB X |

FOREIGN PATENT DOCUMENTS 630765 6/1936 Fed. Rep. of Germany ...... 192/105 BA

Primary Examiner—Rodney H. Bonck

[57] ABSTRACT

A clutch is adapted to be interposed between an electric motor (1) and a gear train (5) for driving a screw on which is mounted a sleeve controlling a locking element. The clutch comprises weights (11) disposed in a hollow member (3) in a position radially of an output shaft (2) of the motor (1), said weights being biased by return springs (21) toward a de-clutched position of rest and being capable of being driven by the rotation of the shaft (2) to a clutching position in which they are engaged with the member (3). The weights (11) are mounted in a support constituted by a hub (12) defining a cavity (15) for the weights and by a cover (16) which closes said cavity (15) and is fixed to the hub (12). The cover (16) is adapted to permit the radial displacement of the weights (11) toward the member (3) under the effect of centrifugal force. This structure facilitates the placing in position of the weights and their assembly by an automatic machine.

5 Claims, 2 Drawing Sheets

CENTRIFUGAL CLUTCH FOR A LOCKING ACTUATOR OF A MOTOR VEHICLE DOOR LATCH

The present invention relates to a centrifugal clutch for the locking actuator of a motor vehicle door latch.

Locking actuators are known for a motor vehicle door latch comprising an electric motor whose output shaft is connected to a gear train driving a screw on which is mounted a tapped sleeve controlling the locking element. In order to reduce the operating effort in the case of a manual locking of the latch, it is conventional to interpose a clutch in the kinematic chain. These clutches are of the type comprising weights disposed in a bell-shaped member radially of the output shaft of the motor, subjected to the action of elastic elements for returning them to a de-clutched position of rest and capable of being driven by the rotation of the shaft of the motor to a clutching position in which they are engaged with the bell-shaped member, the latter being provided with a driving pinion or gear train.

In known clutches, the mounting of the centrifugal weights and their return springs is effected through an axial bore of a cylindrical sleeve provided with radial cavities. This mounting is particularly awkward and therefore presents constructing difficulties.

An object of the invention is to provide a centrifugal clutch arranged in such manner that the weights can be placed in position extremely easily and simply.

According to the invention, the weights are mounted in a support constituted by a hub provided with two substantially axial branches surrounding the weights by defining a cavity for the latter, and by a cover closing said cavity and fixed on the hub, said cover and hub being adapted to permit the radial displacement of the weights toward the hollow bell-shaped member under the effect of centrifugal force.

Thus the support of the weights is formed by two distinct members, namely the hub and the cover fixed to the hub, for example by screwing or clipping together. It consequently becomes extremely easy to place in position the weights and their elastically yieldable return elements by first of all positioning them in the cavity of the hub and then securing the cover on the latter, which operations present no difficulty.

According to a feature of the invention, the output shaft of the motor extends throughout the clutch, i.e. the hub, the space provided between the weights, the cover, the hollow bell-shaped member and the pinion integral with the latter, a support bearing being secured to said shaft beyond the pinion, and the weights being in abutting relation to said shaft at rest.

The fact that the motor shaft extends throughout the clutch enables it to act as a support for the whole of the clutch and as an abutment for the weights at rest, it defining this position of rest.

Further features and advantages of the invention will be apparent from the following description with reference to the accompanying drawings which illustrate by way of a non-limiting example an embodiment thereof.

Figure 1:
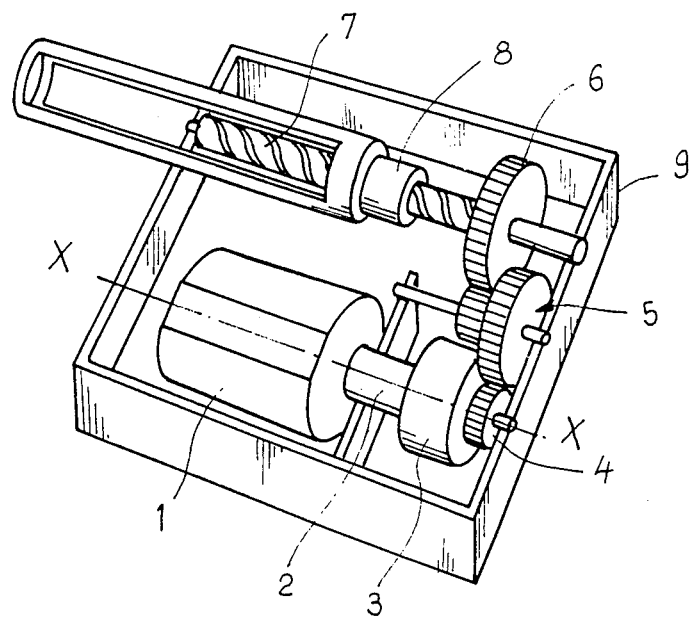
FIG. 1 is a perspective view of a locking actuator of a motor vehicle door latch provided with a clutch which may be of the type according to the invention.

The actuator represented in FIG. 1 is adapted to permit the electrical locking of a latch (not shown) of a motor vehicle door.

It comprises an electric motor 1 having an output driving shaft 2 of axis X—X which cooperates with a coaxial bell-shaped member 3 provided with a first pinion gear 4 constituting the first gear element of a gear train 5. The last pinion gear 6 of the train 5 is fixed coaxially to a screw 7 on which is mounted a tapped sleeve 8 which may be driven in translation by the rotation of the screw 7 so as to actuate the locking element (not shown) of the latch, the assembly of the aforementioned component parts being enclosed in a housing 9.

Figure 2:
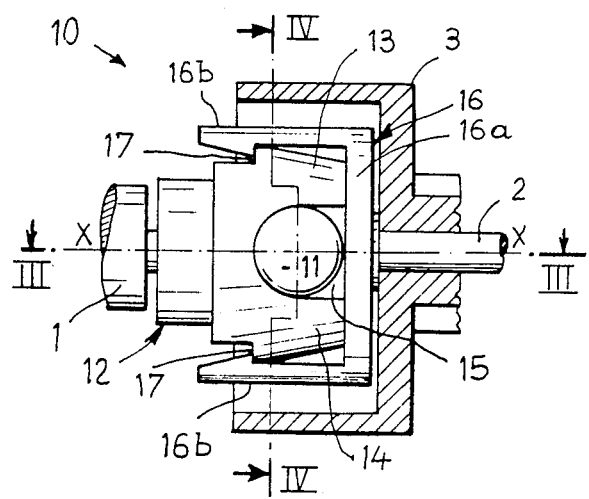
FIG. 2 is an axial sectional view of a centrifugal clutch according to the invention, which may be provided in the actuator shown in FIG. 1.
Figure 3:
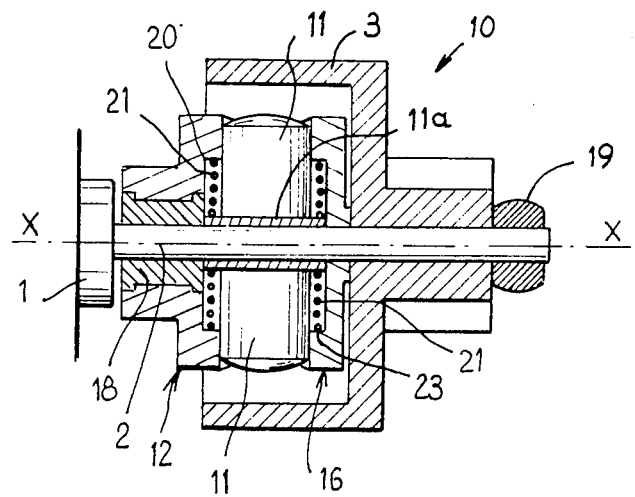
FIG. 3 is an axial sectional view taken on line III—III of FIG. 2.
Figure 4:
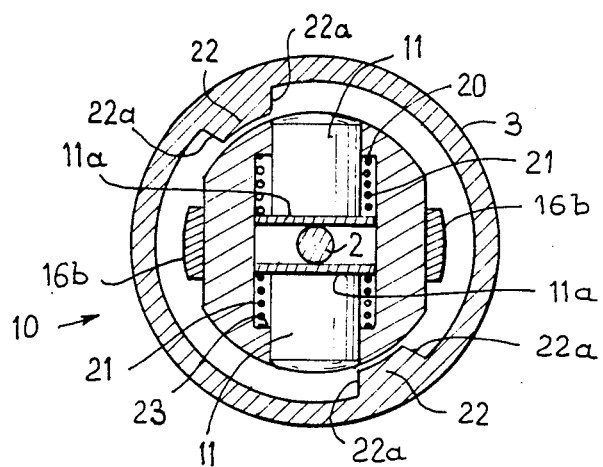
FIG. 4 is a cross-sectional view taken on line IV—IV of FIG. 2.

The clutch 10 shown in FIGS 2 to 4 comprises weights or members 11, two in number in the presently-described embodiment, mounted to be movable radially of the driving shaft 2 inside the hollow bell-shaped member 3. The weights 11 are constituted in the presently-described embodiment by cylindrical members each provided at its base with a projecting flange 11a and are mounted in a support formed by two distinct members, namely a hub 12 provided with two branches 13, 14 which are substantially axial, i.e. extend roughly in a direction parallel to the output shaft 2 of the motor 1 while surrounding the weights 11 and defining for the latter a cavity 15 which is open in the axial direction (axis X—X); the other member being formed by a cover 16 closing the cavity 15.

The cover 16 has a first portion 16a perpendicular to the axis X—X of the shaft 2 for the purpose of axially closing the cavity 15, and a second portion formed by two arms 16b parallel to the axis X—X and, in the illustrated embodiment (FIG. 2), connected with steps 17 of the hub 12 by a clipping action.

The cover 16 is arranged to permit the radial displacement of the weights 11 toward the member 3 under the effect of centrifugal force when the shaft 2 is driven by the motor 1.

The hub 12, preferably made from a suitable plastics material, is moulded onto an insert 18 which is a drive fit on the shaft 2. This assembly by means of the insert 18 results in an improved transmission of the driving torque from the shaft 2 to the hub 12.

The insert 18 is of metal, as are the weights 11, the other component parts of the clutch 10 being preferably made from plastics material.

The shaft 2 of the motor 1 extends throughout the clutch, i.e. the insert 18 and the hub 12, the gap provided between the weights 11, the cover 16, the member 3 and the end pinion gear 4 integral with the latter. A bearing 19 for supporting the shaft 2 is fixed to the shaft 2 in a position beyond the pinion 4.

The weights 11 are elastically biased to their position of rest, in which they are in abutting relation by their flanges 11a to the shaft 2 symmetrically in diametrically opposed positions, by respective springs 21. The springs 21 against inner shoulders 20, 23, respectively, on the shaft 12 and the cover 16 and bias the weights 11 by their flanges 11a to their position of rest in which they bear against the shaft 2.

The cavity 15 defined by the branches 13, 14 and axially closed by the cover 16, opens radially on two sides onto the inner wall of the hollow bell-shaped member 3 serving as the housing for weights 11 and thus enables the weights 11 to slide radially toward the member 3 against the opposing force exerted by the springs 21, when the shaft 2 rotates at sufficient speed.

The bell-shaped member 3 is internally provided with the clutch dogs 22 which are two in number and diametrically opposed in the presently-described embodiment (FIG. 4) and which are cooperative with the respective weights 11. The dogs 22 are advantageously each provided with two chamfers 22a parallel to the generatrices of the weights 11.

These chamfers 22a increse the surface of the contact of the dogs 22 with the weights 11 when the latter move away from the shaft 2.

The fact that, in accordance with the invention, the support of the weights 11 is formed by two distinct members hub 12 and cover 16 permits, before the assembly of the cover 16, the axial introduction of the weights 11 in their cavity 15 without difficulty. This constitutes an important advantage over known prior arrangements. Further, another substantial advantage resides in the fact that the structure of the centrifugal clutch according to the invention enables the weights 11 to be placed in position by a known automatic machine provided with appropriate arms, which was impossible with the prior arrangements.

It must be understood that the scope of the invention is not intended to be limited to the described embodiment and covers modifications. For example, the weights 11 may be in a number different from two, for example three, and have a shape other than cylindrical. Further, the hub 12 and the cover 16 may have shapes different from those illustrated in the drawings so long as they constitute two separate members defining the cavity for the weights.

What is claimed is:

1. A centrifugal clutch for a locking actuator of a motor vehicle door latch adapted for interposition between an electrical motor having an output shaft and a gear train for driving said locking actuator comprising
    a hollow bell shaped member rotatably mounted and coaxial on said output shaft;
    a plurality of weights symmetrically disposed in said hollow bell-shaped member, said weights being separated from each other by a gap and being movable radially under centrifugal force of said output shaft between a clutching position of engagement with said hollow member and a declutched position of rest in disengagement from said hollow member;
    said weights being in abutting relation to said shaft in said position of rest;
    elastically yieldable return elements biasing said weights to said declutched position of rest;
    a pinion gear integral with said hollow member for driving said gear train;
    a hub having two branches which extend in a substantially parallel direction to said shaft and which branches define a cavity for said weights, said cavity being open in a direction axial to said shaft;
    a cover closing the open end of said cavity which is fixed to said hub;
    said cavity being defined by said branches of said hub and being axially closed by said cover while being open radially on two sides onto the inner wall of said hollow bell-shaped member permitting the weights to slide radially toward said hollow member against the elastically yieldable return elements; and
    said shaft extending through said hub, through said cover, through the gap between said weights and through said hollow bell-shaped member.

2. A clutch as claimed in claim 1 wherein said shaft is provided with a support bearing located beyond said pinion gear.

3. A clutch as claimed in claim 1 including a mounting insert for mounting said hub on said shaft, and wherein said hub is formed of molded plastic molded onto said mounting insert.

4. A clutch as claimed in claim 1 wherein said hollow bell-shaped member is provided with clutch dogs on the inside surface thereof and wherein said weights are cylindrical and wherein said dogs are provided with chamfers parallel to the generatrices of said weights.

5. A clutch as claimed in claim 1 including inner shoulders on said hub and on said cover and wherein flanges are provided on each of said weights at adjacent ends of said weights which are remote from said hollow bell-shaped member and wherein return elements are springs bearing against said inner shoulders at one end and against said flanges at the opposite end of said springs to bias said weights into abutment against said shaft in the position of rest.

* * * * *